T. E. OGLE.
BLOWER FAN.
APPLICATION FILED APR. 6, 1920.
1,364,796.
Patented Jan. 4, 1921.
3 SHEETS—SHEET 1.
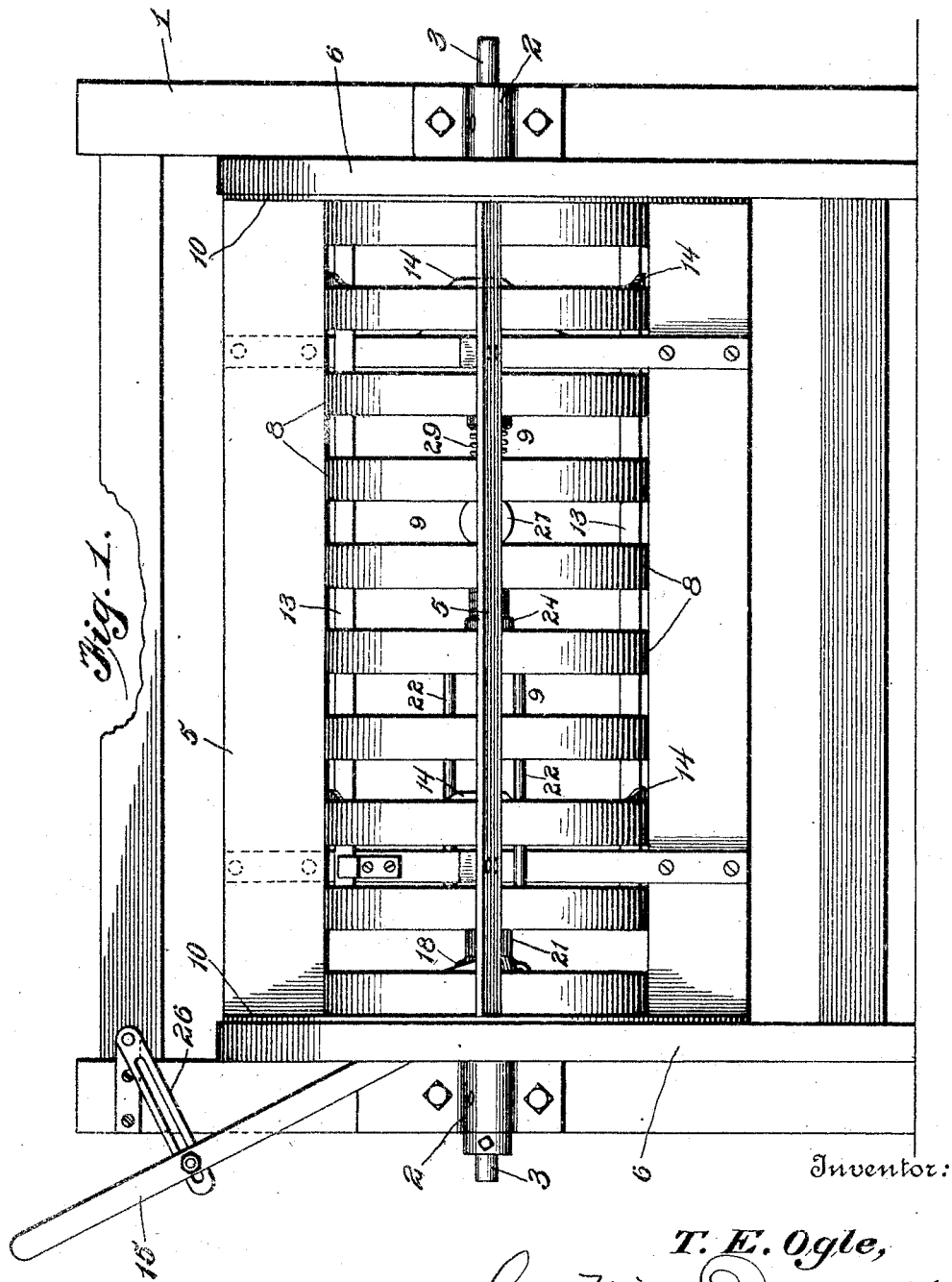
Inventor:
T. E. Ogle,
By Spear, Middleton, Donaldson & Hall
Attorneys.

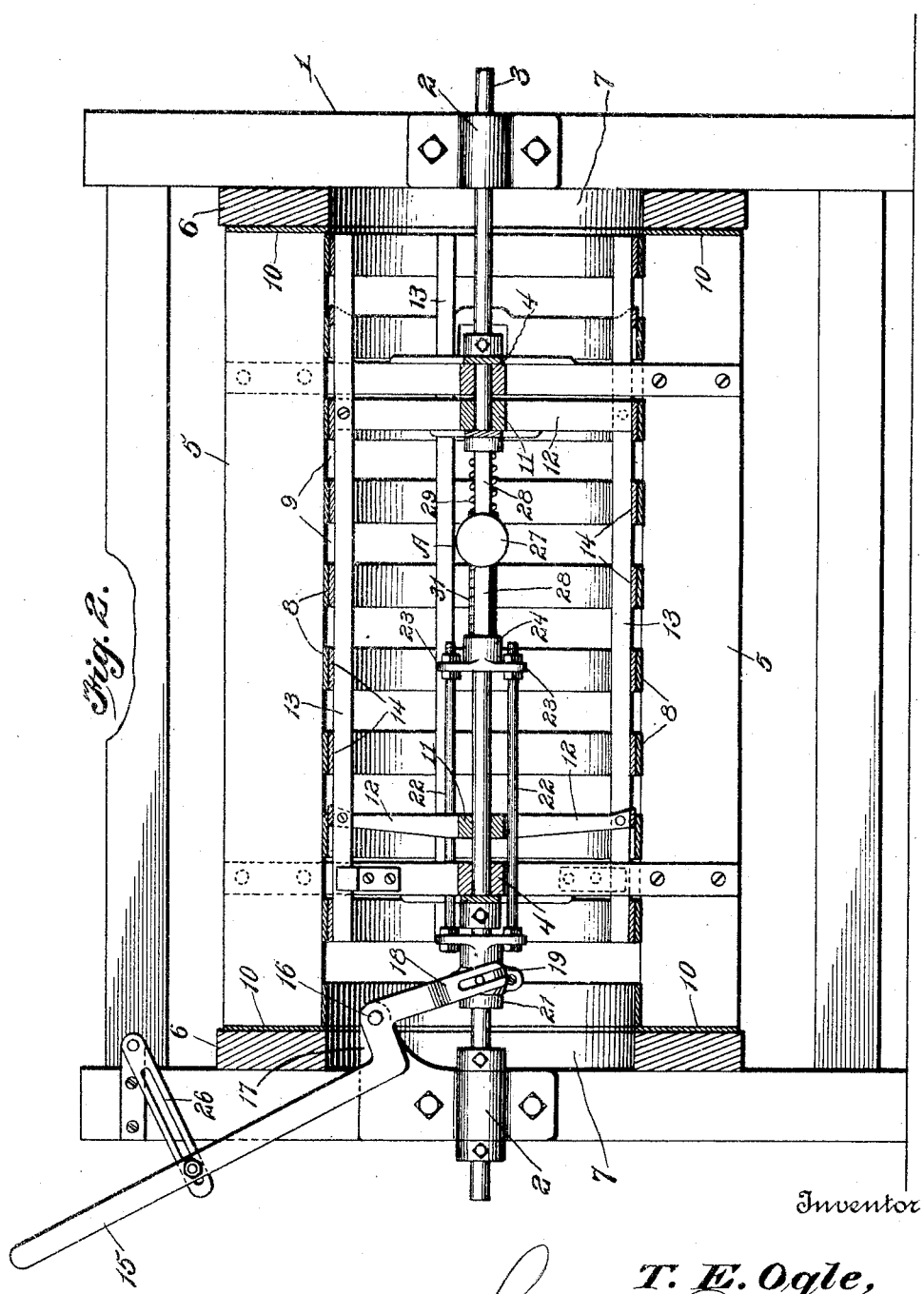

T. E. OGLE.
BLOWER FAN.
APPLICATION FILED APR. 6, 1920.
1,364,796.
Patented Jan. 4, 1921.
3 SHEETS—SHEET 3.
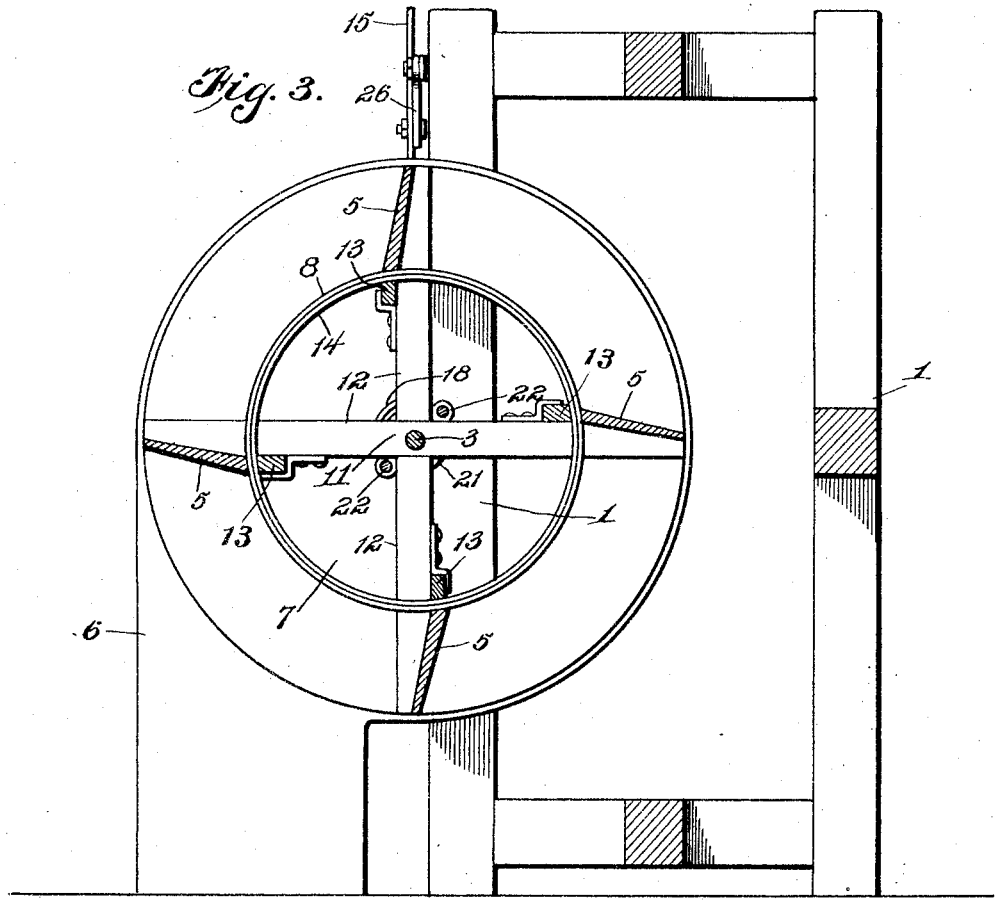
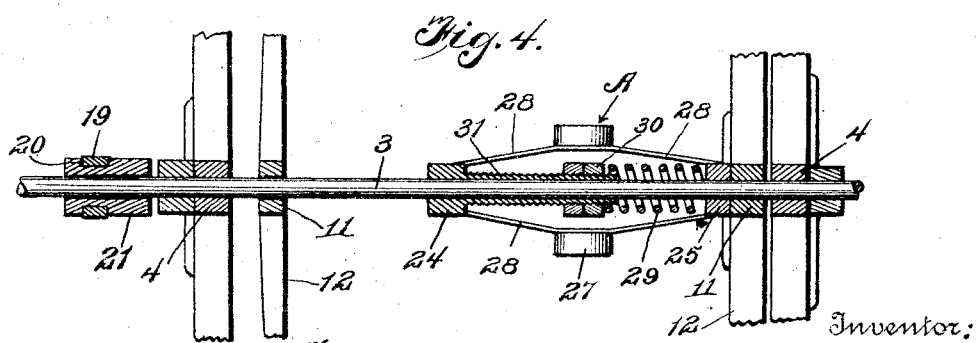
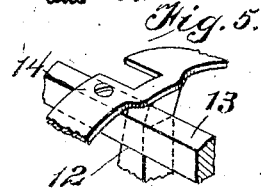
Inventor:
T. E. Ogle,

UNITED STATES PATENT OFFICE.

THOMAS E. OGLE, OF KANSAS, ILLINOIS.

BLOWER-FAN.

1,364,796.

Specification of Letters Patent.

Patented Jan. 4, 1921.

Application filed April 6, 1920. Serial No. 371,693.

*To all whom it may concern:*

Be it known that I, THOMAS E. OGLE, a citizen of the United States, and a resident of Kansas, county of Edgar, State of Illinois, have invented certain new and useful Improvements in Blower-Fans, of which the following is a specification.

My invention is designed to produce uniformity of draft in a blower apparatus throughout the axial length of the fan or blower device and also to provide means for regulating the draft both automatically and by hand.

The invention consists in the features and combination and arrangement of parts hereinafter described and particularly pointed out in the appended claims.

In the drawings:

Figure 1 is a side elevation of a blower apparatus embodying my invention.

Fig. 2 is a sectional view taken longitudinally of the fan shaft, parts being shown in elevation; and Fig. 3 is a transverse sectional view of the apparatus.

Fig. 4 is a detail view partly in section of the governor mechanism.

Fig. 5 is a perspective view of a detail.

One object of my invention is to avoid an objection that exists to blowers as heretofore constructed in that the draft of air is not uniform throughout the length of the fan, this being due to the fact that the air drawn in through the opposite ends of the fan has more pressure when delivered at portions near the end of the apparatus than at the center, thus giving an irregular action on the grain or other material which is being cleaned or acted upon and wasting of the grain because the latter will be blown out with the chaff at the points where the draft is strongest.

In carrying out my invention, I provide means whereby the draft or pressure of air as delivered from the rotary member will be uniform throughout the length of the rotary member so that the grain or other material will be acted upon uniformly at all points throughout the delivery spout or conduit.

In the drawings, the frame is represented at 1 having suitable journals 2 for a shaft 3 which is provided with heads 4 in the form of arms or spiders which support the rotary member carrying the wings 5. These wings are attached to the heads 4 by any suitable means and they rotate between the sides 6 of the main frame. These sides have openings 7 at their ends and the air is drawn in through these openings to be blown out through the conduit by means of the wings 5.

Attached to the wings is a series of bands or rings 8, these being preferably formed of comparatively thin sheet metal and spaced apart to provide ports 9. At the ends of the rotary member, disks or rings 10 are provided so that there will be no access of air direct from the end openings 7 to the spaces between the wings, but on the contrary the air must pass into the center of the rotary member and thence out through the ports 9 formed between the spaced-apart bands. The effect of this construction will be to secure an even distribution of the supply of air to all points along the length of the rotary blower member so that the blast produced by the wings will be uniform throughout the boxing or conduit through which the air is propelled by the blower. The bands may be secured to the wings in any suitable manner as by the screws as indicated.

In order to regulate the size of the ports 9 between the bands 8, I provide a valve member made up of heads 11 having radiating arms 12, to the outer ends of which longitudinal rods or bars 13 are secured. These bars have bands or rings 14 of sheet metal secured thereto and of slightly smaller diameter than the bands 8 before mentioned so that by the movement of the inner frame made up of the heads 11 and the bars 13, the bands 14 will be adjusted in relation to the spaces between the outer bands 8 and thus the size of the ports 9 will be enlarged or diminished according to the requirements of the work to be done.

The inner bands 14 together with the supporting means therefor, consisting of the heads 11 and radiating arms 12, constitute a valve member which, as above indicated, being slidable axially of the rotary blower member, will regulate the size of the openings through which the air passes to be blown or forced by the wings. The heads 11 are slidably mounted on the main shaft 3 and the adjustment of this inner valve member may take place either by hand or automatically.

For the hand operation, I provide a hand lever 15 pivotally mounted at 16 to a bracket 17 secured on the frame, this lever having a forked end 18 engaging a ring 19 which in turn engages a groove 20 in a collar 21 splined or keyed to the main shaft. This collar has rods 22 attached thereto which extend longitudinally and parallel with the main shaft and are attached to arms 23 of a collar 24 which is mounted on the main shaft. This collar is associated with the governor mechanism indicated generally at A, this mechanism including a collar 25 fixed to one of the heads of the valve member, and from this construction it will be seen that by operating the hand lever, the entire valve device including the governor mechanism will be shifted axially in relation to the rotary wing carrying member so that the valve bands 14 will increase or decrease the size of the ports 9 to supply a greater or a less amount of air to be forced onward through the blower. It will be observed that the ports 9 in all adjustments of the valve will be of the same size relative to each other so that an even distribution of the air will be secured throughout the length of the rotary blower member. Any suitable form of holding device may be employed for holding the hand lever in any position to which it may be adjusted and as illustrative of such a device, reference is made to the parts shown at 26.

My improved apparatus will also take care of conditions arising from varying speeds of the blower member so that the apparatus having been once set to approximately meet the conditions of work required will thereafter accommodate itself to variations in speed so that the blast will remain uniform notwithstanding speed variations. For this purpose, the governor mechanism referred to generally at A is employed. Specifically, this governor mechanism includes weight members 27 which are adapted to fly out by centrifugal force or move closely together on a reduction of speed, these members being carried by spring arms 28 which are attached at one end to the collar 25 and at the other end to the collar 24. A spring 29 is also provided bearing against the collar 25 at one end and against an adjusting nut 30 at the other end, the function of this spring being to force the valve back so as to open the ports 9 on a reduction of speed of the rotary member. When the speed increases, the weights fly apart, and thus draw through their spring arms upon the collar 25 and move the valve device axially so as to reduce the size of the ports 9 and hence in a measure cut off the supply of air passing to the wings of the blower.

The action of the governor may be adjusted by the nut 30. This is threaded upon a screw-threaded shank 31 of the collar 24. It will be understood that the means employed for carrying out the principles involved in my invention may be varied, and the above description and the accompanying drawings are presented in an illustrative way and are not to be regarded as restrictive upon the scope of my invention which is defined by the appended claims.

What I claim is:

1. A blower or blast fan comprising a frame, a rotary fan member having wings and a center portion having ports at different points of its length for supplying air uniformly to the wings at different points along the same, and valve means for regulating the size of the said ports simultaneously.

2. A blower or blast fan comprising a frame, a rotary fan member having wings and a center portion having ports at different points of its length for supplying air uniformly to the wings at different points along the same, and valve means for regulating the size of the said ports simultaneously, said valve means being adjustable longitudinally of the ported portion to regulate the ports thereof.

3. A blower or blast fan comprising a frame, a rotary fan member having wings and a center portion having ports at different points of its length for supplying air uniformly to the wings at different points along the same, and valve means for regulating the size of the said ports simultaneously, said valve means being adjustable lengthwise to regulate the ports, and hand operated means for adjusting said valve.

4. A blower or blast fan comprising a frame, a rotary fan member having wings and a center portion having ports at different points of its length for supplying air uniformly to the wings at different points along the same, and valve means for regulating the size of the said ports simultaneously, and governor means operating under variations of speed for regulating the size of the said ports by operating the valve automatically, substantially as described.

5. A blower or blast fan comprising a frame, a rotary fan member having wings and a center portion having ports at different points of its length for supplying air uniformly to the wings at different points along the same, and valve means for regulating the size of the said ports simultaneously, said valve means being adjustable lengthwise of the ported portion to vary the size of the ports, and governor means operating under variations of speed of the fan to automatically adjust the valve member to vary the air supplied to the fan in accordance with its speed of rotation.

6. A blower or blast fan comprising a frame, a rotary fan member having wings and a center portion having ports at different points of its length for supplying air uniformly to the wings at different points along the same, valve means for regulating the size of the said ports simultaneously, said valve means rotating with the fan, and a governor for adjusting the valve means to vary the size of the ports in accordance with the speed of rotation.

7. A blower or blast fan comprising a frame, a rotary fan member having wings and a center portion having ports at different points of its length for supplying air uniformly to the wings at different points along the same, valve means for regulating the size of the said ports simultaneously, means for setting the valve means by hand, and governor means for adjusting the valve from its hand-set position to accord with the speed of the fan.

8. A blower or blast fan comprising a frame, a rotary fan member having wings and a center portion having ports at different points of its length for supplying air uniformly to the wings at different points along the same, valve means for regulating the size of the said ports simultaneously, said valve means being adjustable axially of the fan, hand-operated means for adjusting the valve means, and governor means carried by the adjustable valve means for automatically adjusting the same from its hand-set position to vary the size of the ports according to the speed.

9. A blower or blast fan comprising a frame, a rotary fan member having wings and a center portion having ports at different points of its length for supplying air uniformly to the wings at different points along the same, and valve means for regulating the size of the said ports simultaneously, a shaft carrying the fan, said valve means being carried by and adjustable along the shaft.

10. A blower or blast fan comprising a frame, a rotary fan member having wings and a center portion having ports at different points of its length for supplying air uniformly to the wings at different points along the same, and valve means for regulating the size of the said ports simultaneously, said valve means being adjustable axially of and within the fan.

11. A blower or blast fan comprising a frame, a rotary fan member having wings and a center portion having ports at different points of its length for supplying air uniformly to the wings at different points along the same, and valve means for regulating the size of the said ports simultaneously, said valve means being adjustable axially of the fan, a shaft carrying the fan, a collar on the said shaft, a connection between the collar and the valve, including a governor device for moving the valve automatically for changes of speed and means for setting said collar by hand in fixed position, substantially as described.

12. A blower or blast fan comprising a frame, a rotary fan member having wings and a center portion having ports at different points of its length for supplying air uniformly to the wings at different points along the same, and valve means for regulating the size of the said ports simultaneously, said valve means being of cylindrical form, arranged within the cylindrical center portion of the fan and receiving air through its open ends.

13. A blower or blast fan comprising a frame, a rotary fan member having wings and a center portion having ports at different points of its length for supplying air uniformly to the wings at different points along the same, valve means for regulating the size of the said ports simultaneously, said valve means being adjustable axially of the fan, a shaft carrying the fan, a collar slidable on the shaft, a hand-operated device for setting the collar, a second collar slidable on the shaft, a connection between the two collars, and a governor between the last mentioned collar and the valve means for adjusting the same axially.

14. A blower comprising a frame, a rotary fan member having wings and a center portion made up of spaced-apart cylindrical bands forming ports between them, and a shaft carrying the fan, substantially as described.

15. A blower comprising a frame, a rotary fan member having wings and a center portion made up of spaced-apart cylindrical bands forming ports between them, a shaft carrying the fan, and a valve within the center portion of the fan made up of cylindrical bands adapted to cover, more or less, the ports between the bands of the fan, and means for adjusting the valve axially, said fan receiving air through its open-ended center and through the ports.

16. A blower comprising a frame, a rotary fan member having wings and a center portion made up of spaced-apart cylindrical bands forming ports between them, a shaft carrying the fan, a valve within the center portion of the fan made up of cylindrical bands adapted to cover, more or less, the ports between the bands of the fan, means for adjusting the valve axially, said fan receiving air through its open-ended center and through the ports, and guard rings at the ends of the fan and extending between the wings, said guard rings rotating close to the frame to prevent the passage of air to points between the wings.

In testimony whereof I affix my signature.

THOS. E. OGLE.